UNITED STATES PATENT OFFICE.

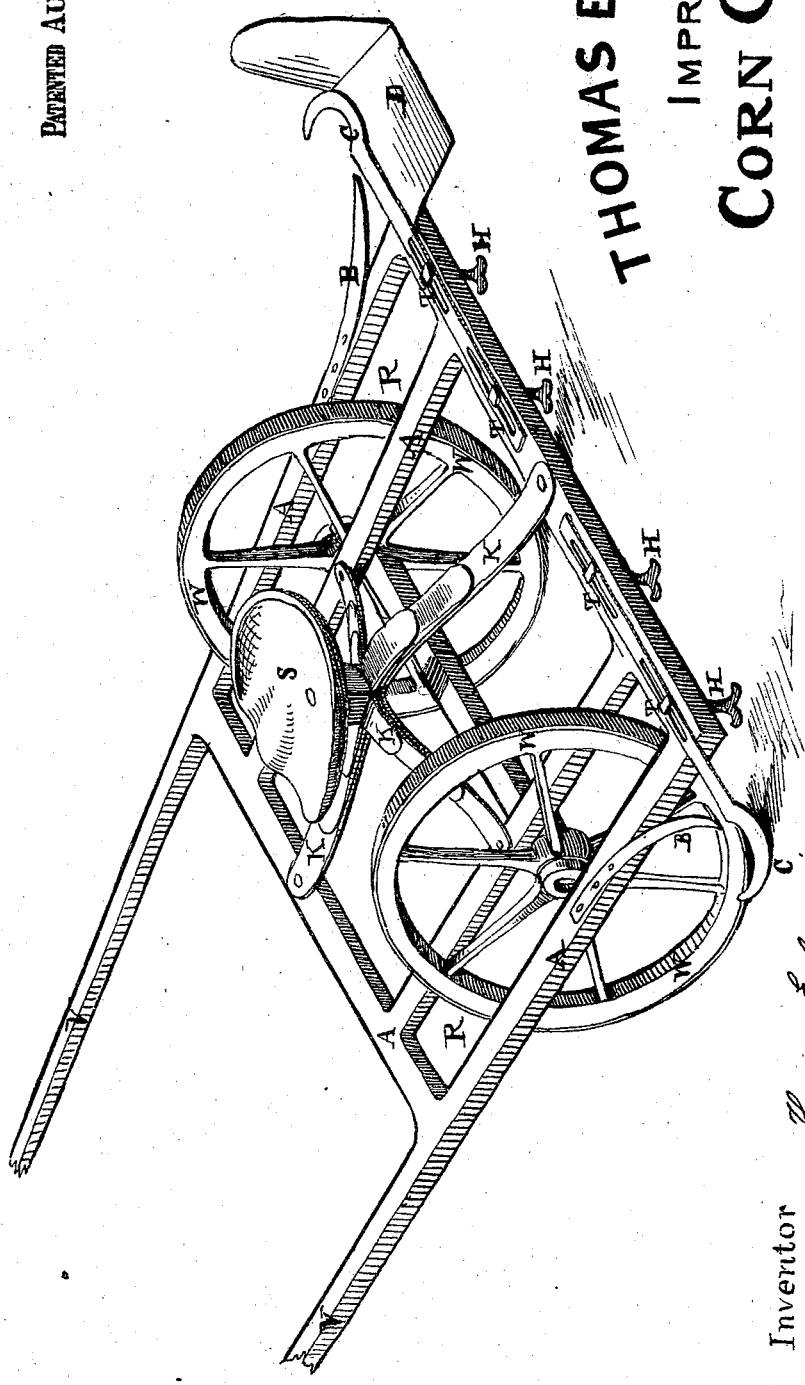

THOMAS E. CURTISS, OF TITUSVILLE, PENNSYLVANIA.

IMPROVEMENT IN CORN-HARVESTERS.

Specification forming part of Letters Patent No. 118,207, dated August 22, 1871.

*To all whom it may concern:*

Be it known that I, THOMAS E. CURTISS, of Titusville, Crawford county, State of Pennsylvania, have invented an Improved Corn-Cutter for the purpose of reaping corn or other similar stalk-growths, of which the following is a specification, reference being had to the accompanying drawing, which is a perspective view of the same.

The object of my invention is to construct a simple and effective apparatus which will accomplish the purpose above mentioned.

For this purpose the body or frame A of the machine is constructed so as to bring the wheels W W within the open spaces R R, and thus protect them from any interference with the corn or other crop that is being reaped, the thills V V for the horse being continued from the body or frame A in the usual manner. Upon the sides of the frame A are fastened the fixed knives or cutters B B, as shown, and upon the rear of the frame A, as shown, the curved knives or cutters C C, moving in the slots T T and secured by the clamp-screws H H. The guide D is placed behind each of the cutters C C to receive and dispose regularly the corn or other crop as soon as cut. Before entering the machine between any two rows of corn the knives C C are previously adjusted to the width required. The whole is provided with the ordinary seat S for the driver, resting upon the springs K K.

I claim—

The cutters C C formed with slots T T and adjusted by the clamp-screws H H, in combination with the guides D, fixed cutters B B, frame A, and wheels W, all constructed and arranged as herein shown and described.

THOMAS E. CURTISS.

Witnesses:
    J. J. HOLDEN,
    HENRY E. WRIGLEY.